March 3, 1970     H. G. HILL ET AL     3,498,262
THIXOTROPIC GEL APPLICATOR

Filed Aug. 18, 1966     3 Sheets-Sheet 1

HOMER G. HILL,
RICHARD M. HAINES &
CHARLES R. MORRISON
INVENTORS

BY Staelin & Overman
ATTORNEYS

March 3, 1970

H. G. HILL ET AL 3,498,262

THIXOTROPIC GEL APPLICATOR

Filed Aug. 18, 1966

HOMER G. HILL,
RICHARD M. HAINES &
CHARLES R. MORRISON
INVENTORS

BY Staelin & Overman
ATTORNEYS

HOMER G. HILL,
RICHARD M. HAINES &
CHARLES R. MORRISON
INVENTORS

United States Patent Office

3,498,262
Patented Mar. 3, 1970

3,498,262
THIXOTROPIC GEL APPLICATOR
Homer G. Hill, Newark, Richard M. Haines, Warsaw, and Charles R. Morrison, Newark, Ohio, assignors to Owens-Corning Fiberglas Corporation, a corporation of Delaware
Filed Aug. 18, 1966, Ser. No. 573,348
Int. Cl. B05c 1/08; C03c 25/02
U.S. Cl. 118—234                                     12 Claims

ABSTRACT OF THE DISCLOSURE

Apparatus for applying a thixotropic gel to glass fibers comprising a support-mounted applicator roll rotatable about a central axis, a pressure confining feed passage discharging tangentially across the width of the roll at the gel pick-up zone, and a smooth shearing surface opposite the surface of the roll for contacting the gel conveyed by the roll.

---

The present invention relates to the application of gels and particularly thixotropic gels to fibers; and more particularly to apparatus for applying thixotropic gels to glass fibers at forming.

The technology which has been developed for the production of glass fibers, presently makes possible the production of fibers having a diameter of from approximately 0.0001 inch to approximately 0.0004 inch, at a rate of from approximately 10,000 feet per minute to approximately 15,000 feet per minute. Glass fibers are produced from small streams of molten glass which exude through tiny orifices located in what is called a bushing. Conventionally, bushings have 204 such orifices. The tiny streams of molten glass which issue from the bushing are attenuated by pulling the fibers until the diameters given above result, and during which time the streams cool and rigidify into what are called filaments. These filaments are then coated with a protective film for the purpose of preventing glass to glass abrasion, and following which they are brought together to form a strand. This strand is coiled upon a spool to form a package. During formation of the package, the strand is traversed back and forth across the spool by a device which is called a traverse, and which is located between the point where the coating materials are applied, and the rotating spool on which the package is made. The spool is rotated by what is called a winding drum, and the pulling action supplied by the winding drum attenuates the molten streams of glass, pulls the filaments past the coating applicator, and through the traverse, and coils the strand onto the package. The winding drum is usually located approximately 10 feet from the bushing, so that the entire forming operation is carried out in a fraction of a second.

The problem of abrasion of glass upon glass is a serious one and has generally been a controlling factor in the rate at which this technology has developed. The seriousness of the problem has caused the wide spread theory that glass to glass abrasion can only be prevented by a solid film of material between the filaments to at all times assure physical separation of the filaments. Regardless of the validity of this theory its acceptance by the art has not caused the art to develop a coating which is completely satisfactory under all conditions for use in separating the filaments during forming. Where the strands are to be woven into textiles, it will be apparent that the amount of film forming materials which can be used must be held within certain percentages of the total weight of the strand in order that the strand will not be unduly stiff. Dyes will not color the glass itself, and so the coatings which are used must either be capable of being dyed, or must be capable of being removed, and later replaced by a material capable of being dyed. Where the glass is to be used for reinforcing plastic materials, the bond between the coatings and the glass filaments is very important, as well as the compatibility of the coating with the later applied resin which the coated strand is intended to reinforce.

The technology in its forty some years of existence has examined all types of materials for their suitability as coatings on glass fibers in attempt to find one which is "universal" in that fibers coated therewith can be used for all known subsequent uses of coated glass strand. The art has tried all kinds of resins, either as emulsions, or as solutions in organic solvents, but all lack some desired characteristics, and usually suffer from high tensions during weaving operations. In addition, organic solvents create explosion hazards. Explosion hazards require expensive equipment to overcome. In general, resins and other materials requiring organic solvents have not been better than coating materials which are soluble in aqueous media, so that the art has substantially universally used coating materials soluble in water. By and large, the most commonly used coating materials for protecting glass fibers during the forming operation comprise starch in some form. Although starch is not durable to the degree that it can stay in place on the filaments and provide protection after the fibers are woven, it has been without equal in its protection of the strands during the various abrasion producing operations that are involved preparatory to, and during weaving. In addition, methods have been developed, usually burning, which are quite satisfactory for removing the starch after weaving, so that any desired finish coatings can then be applied. The art has long desired to replace starch base coatings, which are only temporary in nature, with a single coating material which would perform as satisfactory as starch base materials during forming, and which would also act as a finish size which is capable of being dyed and which will permanently protect the filaments during use. The art would further like this coating material to be a "universal" one, so that it can be used regardless of the end use of the strand. Such a universal coating material for glass fibers has never been developed, and there is considerable belief in the art that one will never be developed, because of the great number of properties which such a material must have.

Coating materials, including starch base coating materials, must be quite fluid when applied to the filaments, in order that the coating materials will completely cover, or "wet out" the filaments in the short length of time that exists before they are brought together into a strand. The amount of "solids" that can be applied to the filaments, therefore, is limited by the degree of fluidity necessary to "wet out" the filaments. It is not possible to apply fluid coating materials in an amount which will completely "wet out" the strands without having an excess present, and a high percentage of the coating fluids brought in contact with the filaments is thrown into the surrounding area as a spray. In addition, the coating collects at different areas of the applicator and winding equipment which then either drips or is thrown to the floor. In all prior art processes with which applicants are aware, the degree of fluidity required necessitates that the coating fluids have only a small percentage of solids, and a high percentage of the coating materals that are carried with the strand into the coiled package in the solvent. The coiled packages of strand which are produced, must be dried prior to subsequent twisting and weaving operations, and during this drying operation, the movement of the fluid or solvent migrates to the surface of the package and carries along with it some of the solid materials which form the coating. This movement of the solid materials with the solvent is commonly called "migration." The art has long been concerned with the problem of migration and a considerable number of patents have been concerned solely with this single problem.

It has been proposed to apply existing coating materials to glass fibers at forming as a thixotropic gel. When a trixotropic gel is applied to a pad type applicator by hand, and the fibers pulled therethrough, a suitable coating can be produced, but the supply of material on the pad cannot be replenished in the usual manner, and no known apparatus is suitable. When a belt type application, as for example that shown in the Brasitigam Patent 2,873,718, is used for application of the gel to the fibers, an uneven coating is produced with some portion of the fibers being uncoated. When uncoated portions of the fibers are drawn together, the strand breaks. In addition, gel collects at various points of the equipment and is either carried along with the fibers to the package as globs, or drops to the floor of the surrounding area. Air bubbles are dispersed throughout the gel and are carried to the glass fibers, with the result that whenever the fibers are drawn through an air bubble, they are uncoated and subsequently break. When an applicator such as shown in the Ewing Patent 3,244,143 is used, air bubbles are also carried along with the gel to the glass fibers with the result that the fibers are uncoated and subsequently break.

An object of the present invention is the provision of a new and improved applicator which can continuously supply a thixotropic gel to the surface over which the fibers are drawn, and which will apply the gel to the fibers in a manner which prevents the fibers from breaking.

A more specific object of the invention is the provision of a new and improved applicator of the above described type which prevents air bubbles from reaching the surface over which the fibers are drawn.

Further objects and advantages of the invention will become apparent to those skilled in the art to which the invention relates from the following description of several preferred embodiments described with reference to the accompanying drawings forming a part of this specification, and in which.

As previously indicated, conventional applicators cannot be used to apply thixotropic gels to glass fibers. In fact, not until the apparatus of the invention was made, was it known that thixotropic gels could be satisfactorily applied to glass fibers. Normal thixotropic gels, are gels at ambient conditions when allowed to assume static conditions. When a shear stress of sufficient magnitude is applied to these gels, they revert to solutions; and when the shear stress is removed, they immediately revert back to a gel. It will be seen that a pad or wick type applicator will not cause a thixotropic gel to move to the area from which the gel is removed by fibers drawn over the applicator. It will also be apparent that an endless belt moving into a body of gel will tend to rip out the gel in an uneven manner and carry it in this condition to a region where it is removed by the fibers. It has also been found that conventional roll type applicators do not work satisfactorily, and the reasons for this, were not apparent until the present invention.

Figure 1:
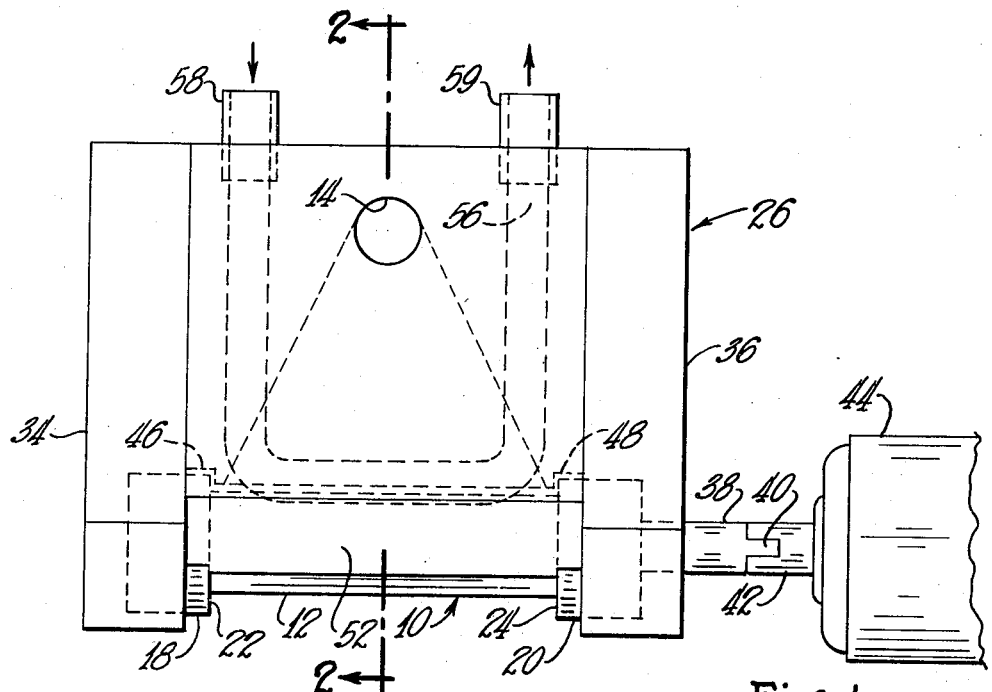
FIG. 1 is a plan view of one embodiment of the invention.
Figure 2:
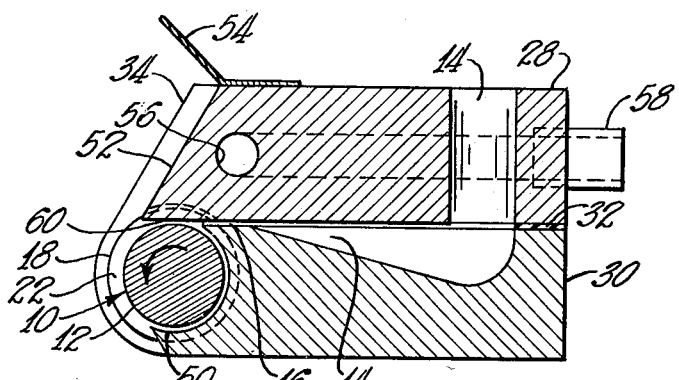
FIG. 2 is a cross sectional view taken approximately on the line 2—2 of FIG. 1.

The applicator shown in FIGS. 1 and 2 of the drawings generally comprises an applicator roll 10, over the front face of which the fibers are adapted to be drawn. The roller 10 may be of any suitable diameter and is conveniently made to have the section over which the fibers are drawn, of approximately one half inch in diameter. A trixotropic gel is fed through a feed passageway 14 to a narrow slot 16 which communicates with the side of the roll opposite from that over which the fibers are drawn. Because the fibers remove the thixotropic gel from the roll at a relatively slow rate, the thixotropic gel passing through the feed passageway 14 is at all times in its gelatinous state. The thixotropic gel is preferably fed to the passageway 14 by a positive displacement pump to assure a uniform supply regardless of the resistance encounter, and the passageway 14 preferably has a uniform cross section through its length. The roller 10 has enlarged portions 18 and 20 at opposite ends to provide shoulders 22 and 24 respectively which confine the gel to the section 12 over which the fibers are drawn. The applicator roll 10 is supported in a housing 26, which may be made in any suitable manner, and as shown in the drawing is conveniently formed by top and bottom center plates 28 and 30 which are separated by a generally U-shaped gasket 32. The open end of the U-shaped gasket 32 forms the slot 16 through which the gel is fed to the center section 12 of the roll 10. The housing 26 also includes opposite side bars 34 and 36, respectively which are suitably fixed to the sides of the plates 28 and 30, in which the enlarged portions 18 and 20 of the roll 10 are journaled. The roll 10 includes an axially extending projection 38 which projects from this side bar 36, and has a tongue 40 thereon for effecting driving engagement of the roll. A drive shaft 42 of a motor driven gear reducer unit 44 engages the tongue 40 to drive the roll.

In the embodiments shown in FIGS. 1 and 2, the enlarged diameter end portions 18 and 20 of the roll 10, project inwardly from the side bars 34 and 36 respectively, and the upper and lower center plates 28 and 30 are suitably notched out as at 46 and 48 to provide running clearance therewith. The gasket 32 surrounds the notched out portions 46 and 48 to confine the gel to the portion of the center section 12 of the roll that is inwardly from the shoulders 22 and 24. In the embodiments shown in FIGS. 1 and 2, the roll 10 is positioned largely in the lower center plate 30, and is located so that the upper surface of the section 12 of the roll just projects upwardly of the top surface of the bottom plate 30. The upper plate 28 is flat and extends over the top of the roll 10. Clearance between the roll 10 and the top plate 28 is provided by the separation produced between plates 28 and 30 by the thickness of the gasket 32. The lower plate 30, therefore, forms a socket for the roller 10 which generally surrounds the roller. The lower plate 30 also includes a lower lip 50 which helps to hold gel onto the roll after the portion of the roll contacted by the fibers separates from the gel.

A curtain of warm air is carried from the heated bushing down to the applicator by the moving glass fibers. It has been found that this curtain of moving air is detrimental to the film of gel on the surface of the roll, and it has also been found that the heat connected therewith may thin out the gel to a degree where uneven coating of fibers results. These effects are overcome in the embodiment shown in FIGS. 1 and 2 by having the front face 52 of the top plate 28 inclined upwardly and rearwardly to produce a pocket. A deflector plate 54 which may be made of a bendable metal, or resilient plastic, is fastened to the top surface of the upper plate 28. The deflector plate 54 preferably has a portion which projects forwardly and upwardly to deflect the curtain of air away from the fibers. The deflector plate 54 also increases the dead air space immediately above the roll. Air that is not deflected away from the fibers expands and swirls into the pocket, to thus slow down the moving air that is positioned between the moving fibers. The embodiments shown in FIGS. 1 and 2 also include a cooling water passage 56 in the top center plate 28 to prevent heat from being transferred to the gel. A suitable cooling water inlet 58 is provided in the back side of the top plate 28 and the passageway 56 returns to an outlet 60 also located in the back surface of the plate 28. It has been found that unlike the prior art roll applicators, the applicator of the present invention removes air bubbles from the gel fed to the roll. It will be noticed that the applicator of the invention has a shear surface 60 positioned closely adjacent to the surface of the roll between the point 16 where the gel is applied to the roll and the point where the fibers remove the gel from the surface of the roll. This surface 60 is preferably adjacent the top surface of the roll as will now be explained.

It will be understood that the thixotropic gel changes to a solution immediately when a predetermined shear is applied thereto. The apparatus shown in FIGS. 1 and 2 is designed to produce this shear between the surface 60 and the top surface of the roll. After this shear is produced, air bubbles that were retained by the gel structure float to the top surface of the solution before the shear is removed and the material leaves the proximity of the shear surface 60. Clear gel is, therefore, left on the surface of the roll, and this clear gel is then moved down into the region where it is contacted by the moving fibers.

Figure 5:
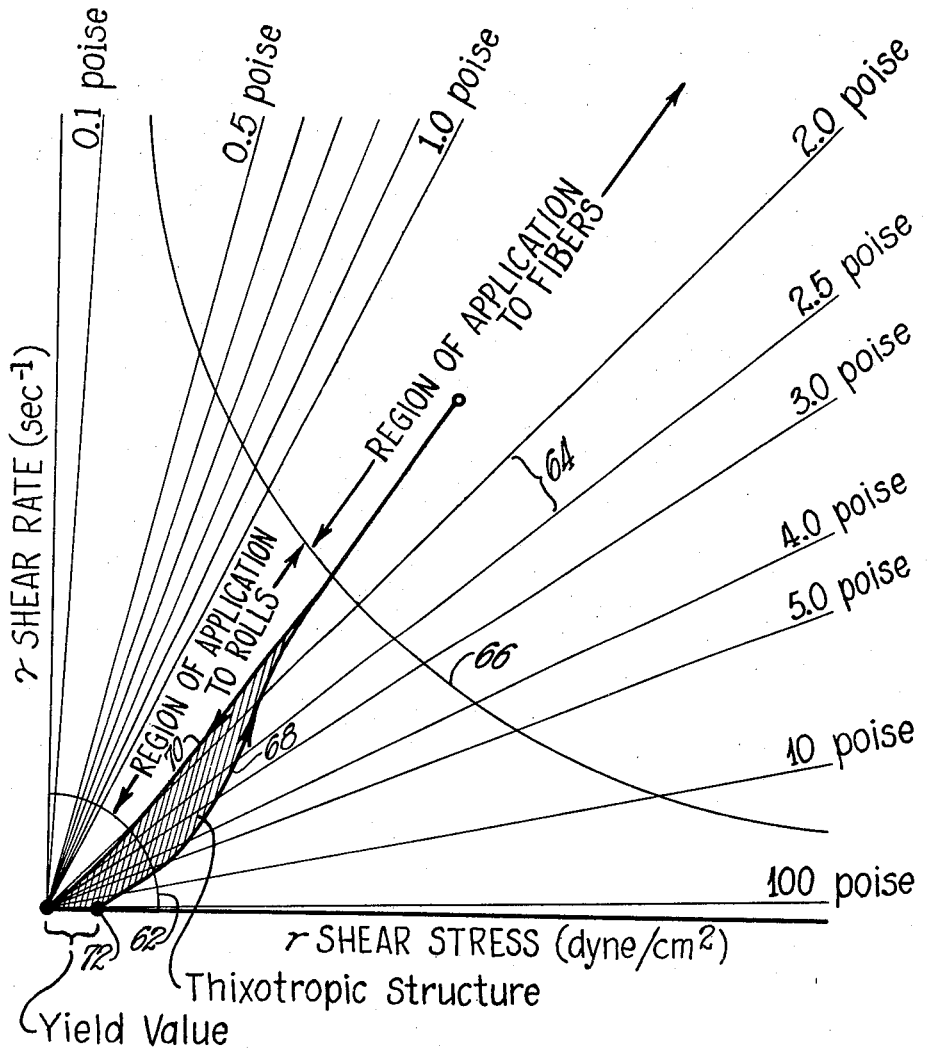
FIG. 5 is a graph indicating how shear stress varies with shear rate for thixotropic gels which break down to various viscosities.

FIG. 5 of the drawings indicates the effect of shear on thixotropic materials. At low rates of shear, the gel elastically deforms, and when slightly greater shear is applied, the gel permanently deforms. No appreciable thinning of the material takes place, however, and this region is generally indicated by the shaded area bound by the coordinates and the curve 62. True solutions have the properties exhibited by the radial lines. Radial lines 64 designate various viscosities. At some shear rate, indicated generally by the curve line 66, gels of the various consistencies will have been changed completely to a solution. Between the curved lines 62 and 66, the materials will be a mixture of solution and gel. The effect of shear on a typical thixotropic material is indicated by the lines 68 and 70. When a shear force of increasing magnitude is applied to a free body of thixotropic gel, it will elastically deform until it reaches a yield value indicated by the point 72. Thereafter the rate of movement (defined as shear rate) increases with increasing shear stress (as indicated by the line 68). When the shear stress, or force, reaches a value corresponding to the intersection of the line 68 and the curved line 66, the thixotropic material will have been changed entirely into a solution, and thereafter the material will behave as a true solution. When the shear stress is reduced, the shear rate decreases in the same manner as occurs in solutions of fixed viscosity, and some portions of the material will start to build up a gel network when the shear stress falls below the curved line 66. The material thickens as the material flows, and it flows as though it were a solution as indicated by the line 70. The spacing between the lines 68 and 70, may be likened to a hysteresis effect, and is an indication of the amount of gel structure present. It will now be seen that if the shear stress provided by the shear surface 60 is above and to the right of the curved line 66, the thixotropic material will behave as a solution to allow air bubbles to rise to the top surface of the material. Separation of the air bubbles, therefore, takes place.

It has been found that if the roll 10 is either positively driven at a high rate of speed or is freely rotated at a high rate of speed by the fibers, portions of the roll will become dry. The roll 10 in the embodiment shown in FIGS. 1 and 2, therefore, is driven at a slow rate of speed to assure that all portions of the section 12 of the roll is coated with the thixotropic gel.

Figure 4:
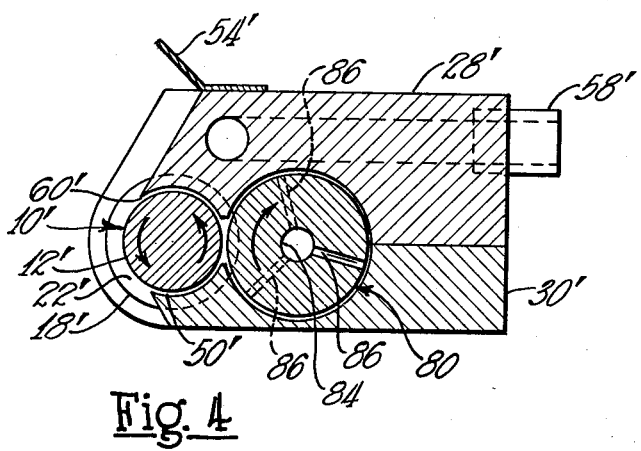
FIG. 4 is a cross sectional view taken approximately on the line 4—4 of FIG. 3.

The reason why dry spots appear on the surface of the roll when the roll is rotated at a high rate of speed is believed to be produced because of shear in the region where the material is fed to the roll. The thixotropic gel is fed through the slot 16 which, of course, is stationary. Referring to FIG. 4, it is seen that the thixotropic material thins out as the rate of shear increases. Since the rate of shear is highest at the surface of the roll, a thin lubricious film develops on the surface of the roll and the gelatinous gel network is retained by the stationary surfaces around the slot 16 and does not attach to the roll. By slowing down the relative velocity between the roll and stationary surfaces, the gel network is caused to extend to the surface of the roll to effect a transfer of the gel from the stationary surface to the surface of the roll.

Figure 3:
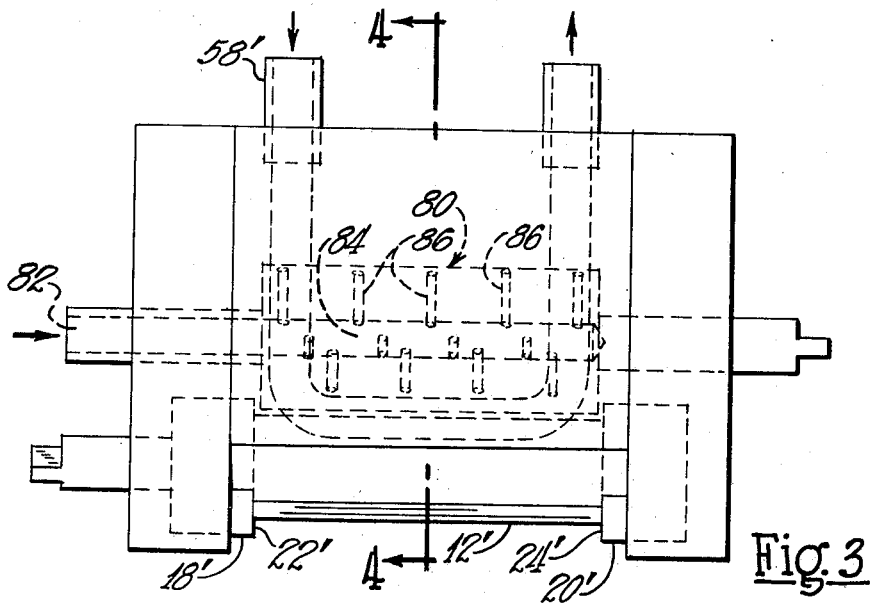
FIG. 3 is a plan view of another embodiment of the invention.

Some advantages exist when the roll which applies gel to the fibers is allowed to rotate freely. One advantage is that the flow of gel automatically stops when the fibers are no longer pulled over the surface of the roll. FIGS. 3 and 4 of the drawings illustrate an embodiment wherein the applicator roll can be rotated by the fibers at a high rate of speed and thixotropic gel is nevertheless fed to the applicator roll without producing dry spots on the applicator roll. Those portions of the embodiment shown in FIGS. 3 and 4 which are similar to corresponding portions of the embodiment shown in FIGS. 1 and 2 are designated by like reference numerals characterized further in that a prime mark is affixed thereto. The embodiment shown in FIGS. 3 and 4 differs principally from the embodiment shown in FIGS. 1 and 2 in that thixotropic gel is fed to the applicator roll 10' by a feed roll 80 which is positively driven by a motor, not shown, to provide a surface velocity which, relative to the surface of the section 12 of the applicator roll, falls within the region between the curves 62 and 66 of FIG. 4. By varying this relative velocity, the amount of thixotropic gel fed to the applicator roll 10' can be controlled. The feed roll 80 has a width less than the spacing of the shoulders 22' and 24' and projects beneath the enlarged portions 18' and 20'. While the surface of the feed roll 80 can be moved faster than the surface of the roll 10' (provided the relative velocities are as above described) the roll 80 preferably has a surface velocity that is less than that of the roll 10', to facilitate transfer of gel to the roll 80 from a stationary surface. The roll 80 could in turn be fed by a train of rolls, the members of which are rotated at progressively slower speeds to achieve sequential gel transfer.

In the embodiments shown in FIGS. 3 and 4, gel is fed to the surface of the roll 80 from beneath the surface. By feeding the gel outwardly from beneath the surface of the roll, the gel network is strongest at the surface of the roll, so that it is retained on the surface even though the velocity of the roll relative to the surrounding stationary surfaces is above and to the right of the curve 66 of FIG. 5. The gel may be fed to the roll 80 in any suitable manner, and as shown in the drawing, is fed from a feed passage 82 positioned on the central axis of the roll 80. The roll 80 has an axially extending passage 84, and a plurality of radial branches 86 which communicate with the surface of the roll. The branches 86 are preferably sequentially staggered, so that the gel will need to spread lengthwise of the roll by a minimum distance. In the embodiment shown in the drawings, three rows of branch passageways 86 are provided 120° apart, and the respective passages of each row are offset longitudinally from those of the other two rolls.

It will be apparent that the objects heretofore enumerated as well as others have been accomplished, and that there has been provided an applicator for thixotropic gels which will provide a film of thixotropic gel that is replenished continuously in a uniform manner and without air bubbles.

While the invention has been described in considerable detail, we do not wish to be limited to the particular embodiments shown and described, and it is our intention to cover hereby, all novel adaptations, modifications, and arrangements thereof which come within the practice of those skilled in the art to which the invention relates.

We claim:

1. Apparatus for applying a thixotropic gel to fibers, comprising: a support, an applicator roll having a central axis and mounted on said support for rotation about said axis to convey gel on its surface from a pick-up zone to a fiber application zone in a predetermined arcuate path, a pressure confining feed passage in said support ending in a narrow exit discharging generally tangentially to said predetermined path across the width of said roll at said pick-up zone, and means to feed the thixotropic gel to said feed passage, said support having a smooth surface opposite the surface of said roll for contacting the surface of gel conveyed by said roll along said arcuate path, and the direction of movement of the surface of said roll and the direction of feed of said gel through said narrow exit being the same and having a generally predetermined relative velocity that is less than the rate of shear which substantially completely changes said thixotropic gel into a liquid.

2. The apparatus of claim 1 wherein said smooth surface is a portion of a flat plate being tangent to and spaced a short distance from said roll, and said pressure confining passage discharging into the converging space between said roll and flat plate.

3. The apparatus of claim 2 wherein said support comprises a pair of opposing sections having adjacent flat surfaces, said roll being journaled in one of said sections with said flat surface of said other section overlying said roll and forming one side surface of said pressure confining passage.

4. The apparatus of claim 1 wherein said roll is at the front of said support and said arcuate path is at the top of said roll, said apparatus including an air deflector plate positioned on the external surface of said support, and which is inclined forwardly and upwardly to intercept a downward flow of air and deflect it away from said roll.

5. The apparatus of claim 1 having a gel applicator surface adjacent said roll at said pick-up zone, and wherein said roll and gel applicator surface have a relative velocity less than the rate of shear which completely changes said thixotropic gel to a solution.

6. The apparatus of claim 1 including: a feed roll journaled in said support with its surface adjoining said applicator roll at said pick-up zone, means for rotating said feed roll to cause its surface to move with a linear surface velocity at said pick-up zone that is in the same direction as the linear surface velocity of said applicator roll and to differ therefrom by less than the speed which causes the gel to change to a liquid, said feed roll having clearance with respect to said support in the opposite direction of its rotation from said pick-up zone to form a portion of said pressure confining feed passage, and means for feeding said feed passage with material under pressure.

7. The apparatus of claim 6 wherein said last mentioned means includes an axially extending opening in said feed roll and means communicating said axially extending opening with the periperal external surface of said feed roll.

8. Apparatus for applying a thixotropic gel to fibers, comprising: a support, a roll having a central axis and mounted on said support for rotation about said axis in a predetermined direction to convey gel on its surface from a pick-up zone to a fiber application zone, and thixotropic gel feed means adjacent and tangent to said roll at said pick-up zone for feeding gel to said roll in said predetermined direction, said roll having a linear surface velocity at said pick-up station which is in the same direction as that of said gel fed to said roll by said feed means, and the difference between the linear surface velocity of said roll and gel fed by said feed means being less than the rate of shear which substantially completely changes said thixotropic gel to a liquid.

9. The apparatus of claim 8 including means for drawing the fibers past said roll and wherein said roll has a linear surface velocity relative to said fibers which is also less than the rate of shear which completely changes said thixotropic gel to a liquid.

10. The apparatus of claim 8 including means for drawing the fibers past said roll and wherein said roll is nonpositively driven and is rotatable by the fibers drawn over the surface of said roll.

11. The apparatus of claim 8 wherein the ends of said roll are closely surrounded by said support, and a center portion of the surface of said roll is of a reduced diameter, said gel feed means applying gel to the surface of said reduced diameter portion of said roll.

12. The apparatus of claim 11 wherein said gel feed surfaces are formed by the peripheral surfaces of a feed roll, said peripheral surfaces of said feed roll being opposite said reduced diameter portion of said first mentioned roll and projecting beneath the surface of said ends of said roll.

References Cited

UNITED STATES PATENTS

| 1,319,114 | 10/1919 | Rice | 118—244 X |
| 1,535,402 | 4/1925 | Doughty | 118—244 |
| 2,117,840 | 5/1938 | Crew | 118—258 |
| 2,331,980 | 10/1943 | Hoffman et al. | 91—50 |
| 2,425,231 | 8/1947 | Dickerman | 117—111 |
| 2,553,592 | 5/1951 | Kucklinsky | 117—111 X |
| 2,693,429 | 11/1954 | Radtke et al. | 117—111 |
| 2,711,713 | 6/1955 | Czarnecki | 118—608 |
| 2,968,278 | 1/1961 | Wolfe | 118—257 |
| 3,267,056 | 8/1966 | Ihde et al. | 260—22 |

WILLIAM D. MARTIN, Primary Examiner

D. COHEN, Assistant Examiner

U.S. Cl. X.R.

117—111, 126; 118—259, 261